United States Patent Office 3,367,807
Patented Feb. 6, 1968

3,367,807
METHOD OF ATTACHING COVER PANEL TO A FOOD CONTAINER
Peter Blandford Feldman, Stoke Poges, England, assignor to Monsanto Chemicals Limited, London, England, a British company
No Drawing. Filed Apr. 20, 1964, Ser. No. 361,262
Claims priority, application Great Britain, May 13, 1963, 18,765/63
4 Claims. (Cl. 156—69)

ABSTRACT OF THE DISCLOSURE

A method of attaching a biaxially-oriented thermoplastic cover to a bonded cellulosic fiber food container by fusing the cover directly to the cellulosic bonding agent of the container.

---

This invention relates to packages and particularly to packages having transparent coverings.

Packages of this sort are obviously desirable in many instances because they allow inspection of the contents, and various ways of ensuring this have been developed. For instance in the type of package intended to be thrown away after use it is quite common to employ as a covering a thin sheet of regenerated cellulose or a transparent synthetic resin, the sheet being used to overwrap completely the container and its contents.

A method has now been discovered whereby simple and effective packages can readily be produced where the container is one made from bonded cellulosic fibers, for instance the molded pulp trays commonly employed in packing foodstuffs.

The method of the invention is one for attaching to a container made from bonded cellulosic fibers a covering of a biaxially-orientated thermoplastic resin, in which the covering is placed over the open top of the container and heat-sealed directly to the container.

The container is one that has been made from cellulosic fibers by means of a bonding agent, which can be an adhesive or a polymer or resin bonding agent, for instance an aminoplast such as urea- or melamine-formaldehyde resins or a phenol-formaldehyde condensate. The cellulosic fibers (such as in wood pulp) are preferably comparatively long, for instance from 1/16 inch to 3/16 inch long, although of course fibers that are shorter than this can also be present. Particularly when unit portions of foodstuffs are to be packed the container will in practice often be for instance a molded fiber tray, probably either rectangular or circular in plan. The invention can also for instance be used to seal a transparent window in a fiber pulp egg container.

Preferably the covering is of a transparent sheet of biaxially-orientated polystyrene, such as is sold under the name "Polyflex" (registered trademark). Other suitable resins which may be biaxially-orientated and used as the covering are polyethylene or isotactic polypropylene; styrene copolymers, for instance styrene-acrylonitrile copolymers; polyacrylates; polymethacrylates; polycarbonates; polyvinyl chloride; and polyethylene terephthalates.

The resin covering can be in the form of a flat sheet, or a sheet can first be molded to any shape desired, for instance by a thermoforming process, such as by vacuum-forming or pressure-forming. Alternatively, after the heat-sealing operation a biaxially-orientated covering can be heat-shrunk by exposing it to radiant heat for a few moments. The covering is normally relatively thin, for instance having a thickness of between 0.0005 and 0.020 inch, particularly between 0.001 inch and 0.008 inch. A cover of thickness 0.001 or 0.002 inch is often convenient to use.

In carrying out the process, the covering can be heat-sealed directly to the edges of the container. The heat-sealing operation is preferably performed at a temperature between 175 and 350° F., preferably between 250 and 300° F., and at a pressure between 5 and 40 pounds per square inch. The pressure depends of course to some extent on the temperature, higher pressures being required where the temperature is lower and vice versa. There can for instance be used a press having electrically-heated jaws shaped so as to conform to the edges of the container. The jaws can be maintained at the sealing temperature by means of thermostat, but preferably there is used an "impulse" heat-sealing method where the jaws are only heated for a brief period of time and then allowed to cool while pressure is still applied. A heating period of up to 5 seconds, for instance between 2 and 4 seconds, is often sufficient; the cooling time can for instance be between 1 and 3 seconds.

The invention is illustrated by the following examples.

Example I

This example describes the production of a packaging container comprising a molded phenolic resin-bonded wood fiber pulp tray having heat-sealed to its edge a cover comprising a biaxially-orientated polystyrene sheet.

The tray is four inches square and one inch deep, and has around its edge a flange 1/4 inch wide. To the flange is sealed a film of biaxially-orientated polystyrene of about 0.001 inch in thickness, using a pressure of 7 pounds per square inch applied for a total of 3.7 seconds. The jaws of the press used are heated by means of a 1400 watt heater for 2.2 seconds and allowed to cool for 1.5 seconds before releasing the pressure.

The resulting container is very strong, and the polystyrene film is so firmly bonded to the edge of the tray that it cannot be detached without tearing the fibers.

Example II

The example describes another method of heat-sealing a biaxially-orientated polystyrene cover to a fiber pulp tray.

A biaxially-orientated polystyrene sheet of about 0.0075 inch in thickness that has been vacuum-formed into the shape of a raised cover is heat-sealed directly on to the edges of a wood fiber pulp tray similar to that described in Example I, using a press having jaws maintained at 275° F. A pressure of 28 pounds per square inch is applied for 3.4 seconds before the press is opened.

The resulting container is very strong and the cover is firmly adhered to the edges of the tray.

Example III

This example describes the production of a container by heat-sealing a somewhat thicker biaxially-orientated polystyrene cover to a fiber pulp tray.

A biaxially-orientated polystyrene sheet of about 0.01 inch in thickness is heat-sealed directly on to the edges of a wood fiber pulp tray similar to that described in Example I using a pressure of 30 pounds per square inch applied for a total of 4 seconds. The jaws of the press are heated by means of a 1000 watt heater for 2 seconds and allowed to cool for 2 seconds before releasing the pressure.

The resulting container is very strong, and again it is found that a "fiber-tearing" seal has been produced.

Example IV

This example describes the production of a packaging container comprising a molded urea-formaldehyde resin-bonded wood fiber pulp tray having heat-sealed to its edges a cover comprising a biaxially-orientated polypropylene film.

The tray is similar to that described in Example I but is bonded with a urea-formaldehyde resin. To the flange is sealed a film of biaxially-orientated polypropylene 0.001 inch thick, using a pressure of 30 pounds per square inch applied for a total of 4 seconds. The jaws of the press are heated by means of a 1000 watt heater for 2 seconds and allowed to cool for 2 seconds before releasing the pressure.

It was found that the polypropylene film is firmly bonded to the edges of the tray and cannot be detached without tearing the fibers.

It is obvious that many variations may be made in the products and processes set forth above without departing from the spirit and scope of this invention.

What is claimed is:

1. A method for attaching a cover panel of a biaxially-oxientated thermoplastic resin to a food container made from bonded cellulosic fibers which method comprises placing the cover panel, having a thickness of about 0.0005 to 0.02 inch, over a marginal edge of the container, and fusing an inner surface portion of said panel directly to the bonding agent of the cellulosic fibers along the marginal edge of said container.

2. A method as in claim 1 wherein the covering is of a transparent sheet of biaxially-orientated polystyrene.

3. A method as in claim 1, in which the covering is of a transparent sheet of biaxially-orientated polypropylene.

4. A method for attaching a cover panel of a biaxially-orientated thermoplastic resin to a food container made from cellulosic fibers bonded with a thermosetting resin, which method comprises placing the cover panel, having a thickness of about 0.0005 to 0.02 inch, over a marginal edge of the container and fusing the thermosetting resin and an inner surface portion of the cover panel at a temperature of from about 175 to 350° F. and at a pressure of from 5 to 40 pounds per square inch, along the marginal edge of the container; said thermosetting resin being selected from the class consisting of aminoplasts and phenol-formaldehyde condensates.

References Cited

UNITED STATES PATENTS

| | | | |
|---|---|---|---|
| 2,402,943 | 7/1946 | Bogoslowsky | 156—69 X |
| 2,413,449 | 12/1946 | Hatch | 156—69 X |
| 2,586,446 | 2/1952 | Stockburger | 156—69 X |
| 3,017,302 | 1/1962 | Hultkrans | 229—87 |
| 3,164,506 | 1/1962 | Lake | 156—69 |
| 3,170,826 | 2/1965 | Norton et al. | 156—69 |
| 3,229,008 | 1/1966 | Harrington et al. | 264—122 |

EARL M. BERGERT, *Primary Examiner.*

HAROLD ANSHER, *Examiner.*